United States Patent Office 3,168,449
Patented Feb. 2, 1965

3,168,449
PROCESS OF PRODUCING MALT AND PRODUCTS PRODUCED THEREBY
Clifford M. Hollenbeck, Manitowoc, and Rudolph W. Brandstetter, Madison, Wis., assignors to Wisconsin-Zinn Malting Company, Manitowoc, Wis., a corporation of Wisconsin
No Drawing. Filed Feb. 12, 1964, Ser. No. 344,257
15 Claims. (Cl. 195—70)

The present invention relates to malt and processes for producing malt. More particularly, this invention is concerned with a novel process of drying malt and novel products of the process.

This application is a continuation-in-part of Serial No. 139,054, filed September 19, 1961, and now abandoned, which is a continuation-in-part of copending application Serial No. 86,874, filed February 3, 1961, now abandoned.

In the usual malting process barley, or other cereal grain, is cleaned, graded according to berry size, steeped in water for a period of time with agitation and water changes until a moisture content of about 45% is reached, allowed to germinate in compartments or drums with temperature control and carbon dioxide removal by continual flow of cool, humidified air and at the desired growth stage (generally when the acrospire is about ¾ to full length of kernel and the rootlets are one or more lengths of the kernel) the moist malt (green malt) is dried by the passage of warm, dry air through the green malt in a malt kiln. Malt is produced and used at relatively low moisture levels, and generally with not more than 6% moisture, compared to the original barley having greater than 10% moisture.

The drying step in the malting process is quite critical, since it is necessary to dry the green malt from about 45% moisture to not more than 6% moisture without the heat destroying the enzymatic activity of the malt. In addition to decreasing the moisture level, the drying step is very important from the standpoint of inducing limited caramelization of the sugars and dextrins, which largely accounts for the pleasant flavor and aroma of malt. Excessive caramelization during drying, however, adversely affects the flavor and color of the malt.

During the usual kilning process warm, dry air is passed through the green malt, first at temperatures of about 100–140° F., or 38–60° C., then after the malt is relatively dry (less than 10% moisture) the temperature of the air is increased to the range of 160° F., or 71° C., then after further drying the temperature of the air may be increased to 180–200° F., or 82 to 93° C. Generally, these drying stages occur on the decks of a two or three deck kiln with the drier malt on the lowest deck, nearest the heat source and the effluent warm air from the lower decks serving as the drying air for the upper decks. The total drying time usually takes over 20 hours. This type of drying schedule is necessary for control of caramelization and for prevention of excessive destruction of enzymes, since both moisture and heat catalyze enzymatic loss, as well as caramelization of carbohydrates.

The specific temperature-time-moisture schedule used on a given lot of green malt depends largely on the type of malt desired. For example, a brewers' malt for imparting darker color to beer can be kilned for more color formation (darker wort color) either by increasing the temperature earlier in the drying process while the moisture level is relatively high (often called "stewing"), or by holding the drier malt at the high temperature (180–200° F., or 82 to 93° C. range) for a longer time. The latter method is used more often for increasing wort color since the former is more difficult to control, it is more severe on enzyme activity, and often imparts "stewed" or cooked qualities to the malt. On the other hand, a brewers' malt for a pale beer is kilned to give a low wort color and necessarily must be kilned very carefully for longer periods at lower temperatures to prevent "stewing" and excessive caramelization.

Malt kernels, especially the plumper ones, are shaped such that their drying surface to weight ratio is comparatively low. Thus, the surface of the kernels may dry quite rapidly, but the total drying is dependent upon the migration of the moisture from the inner "spongy," hydrophilic, endosperm mass to the surface. In plump kernels, this migration may take place rather slowly, and the drying process accordingly slowed with greatly increased chances for excessive caramelization and enzyme loss. Also, difficulty is often experienced with the kiln drying of malt on humid days because the higher moisture content of drying air slows the drying and induces "stewing," within the malt kernel.

It is an object of this invention to provide a novel process of drying green malt. It is also an object of this invention to modify the physical condition of the green malt and thereby greatly accelerate its drying.

According to the present invention it has been discovered that cool green malt can be converted to dried malt without significant loss of diastatic activity or other necessary and desirable properties possessed by malt, and in a much shorter time, by carefully modifying the physical condition of the green malt and then drying the malt for a shorter total time.

It has been found that the physical condition of green germinated malt kernels can be advantageously modified or altered by carefully crushing, compressing, rupturing or flaking the cool green malt kernels, such as between flaking rolls. The crushed kernels are characterized by breakage of the husks and a partial but minor exudation of the endosperm mass and moisture through the husks. Also, the crushed kernels usually maintain an integral and unitary form.

The crushing or flaking process is effected without excessive damage to the malt husk which serves as a filter bed during the lautering step in brewing, and without making the malt kernel so thin and fragile that it breaks and powders during subsequent drying and handling. This careful crushing or flaking is preferably accomplished by passing the green malt between smooth or slightly corrugated steel rolls. These rolls are set apart at a distance to break the husk envelope of the malt, to crush the endosperm mass to the extent that it exudes moist matter through the break in the husk, and to at least transitorily flatten or flake the whole kernels between the rolls, or other crushing means, without disintegration of the kernels. As used herein the words "flaking" and "crushing" have particular reference to the actual step of compressing or crushing the kernels, although by crushing the kernels far enough the resulting kernels keep a flake-like appearance.

The extent of crushing will, of course, vary with the cereal used as well as the variety and degree of plumpness. In general, however, the kernels are at least transitorily reduced in thickness at least about 30% or one-third, and advisably about 50% or more, in the actual crushing or flaking operation regardless of the compressing or crushing means which is used. It is undesirable to comminute the green malt in any way prior to crushing since this would break the husk excessively and entangle the endosperm mass with rootlets, if present.

At the time the kernels are subjected to the crushing or compressing operation they are converted to clearly defined flakes. After leaving the crushing means, the kernels may spring back considerably and look less flake-like than when being compressed. Thus, kernels which are compressed by rolls to about one-half their green malt kernel thickness can spring back to an average of about 75 to 90% of the original kernel thickness. Such crushed kernels, after springing back, are similar in appearance to uncrushed kernels. Close examination of the green kernels and the dried crushed kernels is needed to distinguish the slightly flaked form of the crushed, from the uncrushed, kernels. This similarity between the final products is an asset because (1) the product can be handled, stored an milled in just the same way as conventional malt with no special equipment being needed and (2) the brewing and distilling industries are still arts bound by tradition and prefer a product which is like the one used historically. Of course, by more extensive crushing a more drastically flaked product is obtained directly from the rolls and there is less spring back to the original size. In other words, the kernels take more of a set due to the crushing. It is advisable however to crush the kernels so that after springing back, if they do spring back, the average thickness is not more about 90%, and advisably not more than about 85%, of the thickness of the uncrushed green kernels. This discussion has particular reference to barley malt. Malt of other grains will crush slightly differently. In the case of wheat kernels, they are less resilient and when crushed or fractured the kernels usually spring back much less than barley.

The crushing or flaking operation requires no simultaneous hetaing of the rolls or the green malt. Advisably, the green malt and rolls are cool, i.e., at a temperature of 5° C. to 35° C., but more often at 15 to 30° C. with the usual temperature being about 20° C. at the time of crushing. The green malt as used is usually very near the temperature of the malt house since there is no apparent value to further cool the malt before crushing. The malt is not warmed before crushing as this is not necessary and would only adversely affect the enzyme activity and flavor potential of the malt and promote micro-organism growth. The use of hot rolls or the application of considerable heat, either prior to or immediately after crushing, is detrimental because it would destroy the malt enzymes and caramelize the malt sugars which are the two factors purposely avoided by crushing the malt and carefully drying it.

The moisture content of the green malt at the time of crushing is not narrowly critical but should be at least 25%. Green malt at the end of germination is above 40% moisture, and usually is at 42 to 46% moisture, and it can be crushed or flaked directly as the cool green malt is transported from the germinating beds to the kiln for drying. Green malt of about 42 to 46% moisture crushes very well, with moderate breakage of the kernel, and with little clumping or adhesion between the crushed kernels. However, the green malt of 42 to 46% moisture can be partially dried and the moisture reduced down to a minimum of 25% prior to crushing or flaking. When the green malt moisture goes below 25% the crushing breaks the husk of the kernel excessively and a grinding, rather than flaking, effect results. Furthermore, if extensive drying occurs before crushing, color formation and enzyme loss could occur and would minimize the advantages achieved by crushing and drying the malt.

The green malt is generally crushed with the rootlets attached. Rootlets can be removed, however, prior to crushing to prevent embedding rootlet material into the exposed endosperm while crushing and to obviate the necessity of rootlet removal (cleaning) of the finished crushed malt. The rootlets can be removed by agitating a slurry of the green malt and either floating off the rootlets, or straining out the malt, or by partially drying the green malt until the rootlets are brittle enough to break off. The malt, however, can be germinated free of rootlets and then crushed or flaked as described herein.

One way malt can be germinated essentially free of rootlets is by acidulating the barley while also contacting it with a growth-stimulating amount of gibberellic acid, in the period from initial steeping to the growth or germination stage prior to any significant growth or germination, viz, usually within about 6 hours, and as much as 1 day, or slightly longer, after steep out, and thereafter completing the germination. By "acidulating" is meant applying an acidic substance to the grain, such as by spraying or immersing the grain in an aqueous solution of the acidic substance to inhibit growth. Sulfuric and hydrochloric acids are particularly useful for the acidulation. Steeping at a pH of 1 to 3 is generally suitable to effect acidulation. About 1 to 3 p.p.m. of gibberellic acid based on the weight of braley is adequate for the process. Other procedures of malting to reduce greatly, or eliminate, rootlet formation may also be used to produce green malt, without rootlets, which can be crushed in this process.

After the green malt has been crushed, it is placed in a suitable drying structure such as a kiln and dried until the moisture content is not more than 6% by weight. The crushing or flaking of the green malt makes possible a greatly accelerated drying rate compared to that used to produce dried malt of approximately the same properties from green malt that is not crushed. A combination of factors appears to render the crushed malt more rapidly driable. The crushing makes the kernels thinner and thus increases the surface area that can be heated. Also the crushing releases some intaernal moisture that forms a film on the kernels from which it is more readily evaporated. In addition, the crushing permits the water vapor to exit faster, and the heat to penetrate quicker, than with uncrushed kernels. The drying times for crushed or flaked green malt can be reduced by at least one-third, and generally by at least one-half, the drying time needed to dry an uncrushed green malt at the same temperatures to produce malts of substantially the same properties, such as wort color, enzymatic activity, soluble protein and extract. Usually, these properties are significantly and beneficially enhanced in malt obtained by the rapid drying achieved with crushed green malt.

The crushed malt, by drying more rapidly and efficiently, is not affected as much as regular uncrushed malt by water vapor in humid drying air.

The reduction in drying time using crushed green malt is achieved without necessitating the use of higher drying temperatures than are normally required. Less heat is thus needed for the drying and, in addition, the drying capacity of the kiln is raised greatly so that production can be increased per capital investment.

The crushed or flaked green malt is dried in stages beginning with relatively low temperatures and ending with the high temperatures. A minimum of 5 hours' heating is generally required. The time of heating at a particular temperature stage or within a temperature range will depend to some extent upon the final qualities desired in the malt. However, in almost all cases the first one-third of the total drying time after crushing should be at not more than 140° F. or 60° C. It is usually desirable to employ a drying temperature of not more than 120° F. or 49° C. in the first one-fifth, and a drying temperature of not more than 140° F. or 60° C. in the first two-fifths, of the total drying time after crushing. More specifically, a drying temperature of not more than 110° F. or 43° C. can be used in the first one-fifth, a drying temperature of not more than 120° F. or 490 C. in the first two-fifths, and a drying temperature of not more than 140° F. or 60° C. in the first one-half, of the total drying time is particularly suitable for production of a light malt, especially when the drying continues for at least about 10 hours. When a heating schedule is designed to dry the crushed green malt below 6% moisture and give a malt with suitable brewing characteristics, it is unusual that a heating time above 15 hours is required. The usual heating time is from 10 to 15 hours.

The reduction is drying time achieved by crushing is readily shown. Uncrushed green malt must be dried at least 12 to 15 hours at 140° F. (60° C.) to be dry, although it generally is not dried at this temperature in one step since it would inactivate the enzymes totally and produce a high color, "stewed" malt. Crushed or flaked green malt could be dried in 6 to 8 hours at 140° F. or 60° C., but this would not be done since the high temperature while the malt is moist would inactivate the malt enzymes.

The process of this invention is particularly suitable to the drying of green malt produced by germination of the grain treated with the plant hormone gibberellic acid.

When low levels (a few parts per million) of the plant hormone gibberellic acid or its growth promoting derivatives are added to malt, during the early stages of germination, the germination is accelerated, some enzymic processes are stimulated, and certain desirable qualities are gained by the malt. A severe limitation to the use of gibberellic acid, or its derivatives, in malt for the brewing of beer, lies in the malt being much more susceptible to adverse kilning effects. The wort color for example, from a gibberellic acid treated malt is generally higher than for untreated malt from the same kilning treatment. Flaking or crushing of the gibberellic acid treated green malt prior to drying, with the subsequent more efficient drying, keeps the caramelization during drying to a minimum and thus allows the gibberellic acid treatment in Brewing Chemists' procedures. The following drying schedules were used:

BREWERS' MALT DRYING SCHEDULES

| Regular | | | Crushed or Flaked | | |
|---|---|---|---|---|---|
| Time (hrs.) | Temp. | | Time (hrs.) | Temp. | |
| | (° F.) | (° C.) | | (° F.) | (° C.) |
| 2 | 90 | 32 | | | |
| 2 | 100 | 38 | 1 | 100 | 38 |
| 1 up to | 110 | 43 | | | |
| 6 | 110 | 43 | 3 | 110 | 43 |
| 1 up to | 120 | 49 | | | |
| 3 | 120 | 49 | 2 | 120 | 49 |
| 1 up to | 140 | 60 | | | |
| 8 | 140 | 60 | 4 | 140 | 60 |
| 5 | 180 | 82 | 2 | 180 | 82 |
| 29 hrs. | | | 12 hrs. | | |

DISTILLERS' MALT DRYING SCHEDULES

| 10 | 110 | 43 | 5 | 110 | 43 |
|---|---|---|---|---|---|
| 2 up to | 120 | 49 | 1 up to | 120 | 49 |
| 6 | 120 | 49 | 3 | 120 | 49 |
| 2 up to | 140 | 60 | 1 up to | 140 | 60 |
| 2 | 140 | 60 | 1 | 140 | 60 |
| 22 hrs. | | | 11 hrs. | | |

*Table 1*

| Type of Malt | Critical Malt Properties | | | | |
|---|---|---|---|---|---|
| | Moisture (Percent) | Wort Color (Degrees) (Lovibond) | Soluble Protein (Percent of Total) (Protein) | Extract Dry (Percent) | Diastatic Power (Degrees) (Lintner) |
| Regular Brewers' Montcalm | 4.0 | 1.40 | 38.9 | 77.7 | 124 |
| Crushed Brewers' Montcalm | 2.0 | 1.22 | 35.5 | 77.1 | 130 |
| Regular Brewers' Kindred | 3.6 | 1.34 | 44.4 | 77.2 | 115 |
| Crushed Brewers' Kindred | 1.4 | 1.19 | 45.0 | 76.2 | 127 |
| Regular Gibberellic Acid Treated Brewers' Kindred | 3.7 | 1.79 | 49.6 | 77.4 | 123 |
| Crushed Gibberellic Acid Treated Brewers' Kindred | 1.4 | 1.32 | 48.4 | 78.0 | 120 |
| Regular Brewers' Kindred Plump | 3.9 | 1.47 | 41.1 | 76.4 | 132 |
| Crushed Regular Brewers' Kindred Plump | 2.4 | 1.07 | 42.9 | 77.4 | 121 |
| Regular Brewers' Hannchen | 4.2 | 1.32 | 38.4 | 79.4 | 109 |
| Crushed Brewers' Hannchen | 1.7 | 1.21 | 35.6 | 79.1 | 91 |
| Regular Distillers' Kindred | 5.5 | 1.45 | 43.2 | 74.3 | 214 |
| Crushed Distillers' Kindred | 4.3 | 1.41 | 43.6 | 74.8 | 212 | malt without a disadvantageous high color formation during kilning. These disadvantages result when the gibberellic acid is employed in the more or less conventional malting processes which produce malts containing rootlets, or when it is used in combination with acidulation to produce a malt germinated rootlet free, as previously described herein.

The following examples are presented to illustrate the invention.

EXAMPLE 1

The effects of crushing or flaking, with resulting faster more efficient drying, on the properties of malt are illustrated in the data in Table 1. In all examples, samples of green malt were taken from germination compartments at the stage when the green malt at 20° C. was ready for drying. The samples were crushed by passing them between two smooth steel rollers also at 20° C. set close enough together to crush and flatten the malt kernels. The average thickness of the crushed malt kernels was approximately one-half the thickness of the uncrushed malt kernels. The kernels varied in thickness, however, from about one-fourth to about two-thirds the original kernel thickness. The crushed malt was then dried in a pilot kiln with the same temperature schedule as a regular commercial kiln, except the time schedules at a given temperature were shortened considerably (generally cut in half). It did not contain swollen starch. All of the data was determined by the regular American Society of Brewing Chemists' procedures.

The drying of the crushed or flaked malt samples in Table 1 was more extensive than necessary, since the moisture levels were well below the average of 4.0% for brewers' malt. The data, however, demonstrates the greatly improved drying efficiency with the overall time of drying being decreased by at least 50%. Even with the increased drying the malt colors (wort color) were considerably lower than the controls. Furthermore, with the increased drying efficiency, the diastatic power was not significantly decreased and averaged about the same as the controls. It is noted particularly that the gibberellic acid treated malt with its usual high wort color dried to a malt with normal wort color when the malt was crushed or flaked prior to drying.

Other advantages than those discussed above and demonstrated by the data in Table 1 are gained by crushing the green malt prior to drying. For example, malt is usually treated with low levels of sulfur dioxide during drying to brighten its appearance, and to activate the proteinases for greater soluble nitrogen production during the brewing mashing process. The crushed or flaked malt with its exposed endosperm and greater surface area reacts faster with the sulfur dioxide so that much less sulfur dioxide is needed. Furthermore, the crushing process improves the yield of extractible carbohydrate and soluble protein materials from the malt in the brewing process (brew-house yield). An example of this latter advantage was observed in comparing the brew-house yield from a pilot brewing experiment with regular brewers' malt versus the same malt crushed or flaked and dried in accordance with the foregoing. The regular malt yielded 73.0% extractible material from the mash while the crushed malt yielded 75.2%.

EXAMPLE 2

*Example of effect of crushing prior to drying on gibberellic-acid treated malts*

The beneficial effect which crushing or flaking has on a malt produced using gibberellic acid with acidulation is illustrated by the following example.

Six samples of Kindred barley (400 g. each) were steeped in the usual manner and then each treated with a solution of sulfuric acid (0.47 ml. of concentrated sulfuric acid in 3 ml. of water) and a solution of gibberellic acid (0.4 mg. in 5 ml. of water). The samples were germinated with the usual periodic turning in pilot units for a period of 4 days at 17° to 18° C. The barley modified into malt in the usual manner except it did not develop rootlets and respired very little during this modification. Three of the samples were crushed or flaked at 20° C., the remaining three samples were kiln dried without crushing. The whole kernel samples were kiln dried with the following schedule: 12 hours at 49° C., 4 hours at 60° C., 6 hours at 71° C. and 2 hours at 82° C. The flaked samples were dried: 12 hours at 49° C., 4 hours at 60° C., and ½ hour at 71° C.

The analyses on composite samples of the three whole malt and the three flaked malt samples are shown in the following:

|  | Moisture (Percent) | Wort Color (° L) | Soluble Protein (Percent of total) | Extract Dry (Percent) | Diastatic Power (° L) |
| --- | --- | --- | --- | --- | --- |
| Whole Malt | 4.0 | 3.04 | 57.7 | 78.0 | 150 |
| Crushed or Flaked Malt | 3.6 | 1.77 | 50.9 | 75.2 | 168 |

It is noted that the crushed or flaked samples, with a shorter drying period, are considerably lower in wort color and soluble nitrogen than their regular kernel controls.

EXAMPLE 3

Measurements of the extent of commercial crushing operations were obtained by using a micrometer graduated in 1000ths inches, first on whole green malt kernels and then after the green malt kernels had been compressed by passing through two steel rolls set .055 inch apart.

The following Tables 2 and 3 contain data for gibberellic acid-acidulated green malt and regular green malt and give the kernel thickness before and after crushing, followed by a springing back, indicating that the kernels after compression or crushing have a final thickness about 20 to 30% less than the original thickness. The flaking, crushing or compression of the rolls compress the kernel thickness to about one-half the original thickness in passing through the two steel rolls, but the kernels in passing through the two steel rolls, but the kernels immediately spring back, here to an average of about 80% of original kernel thickness. However, upon close inspection the green malt is characterized by a slight broken husk, with a partial discharge of the endosperm mass and moisture through the break in the husk. The shape appears flattened and more rectangular than the normal diamond shape of uncrushed kernels, but the thickness of the kernels has decreased about 20%.

*Table 2*

G.A.=gibberellic acid-acidulated green malt
Green malt—approx. 40% moisture
Roll setting—.055" apart (av.)

| G.A. whole kernels,[1] Av. thickness per 10 kernels, inch | G.A. crushed kernels [2] immediately after compressing, Av. thickness/10 kernels, inch | G.A. crushed kernels [3] 1 hr. after compressing, Av. thickness/10 kernels, inch |
| --- | --- | --- |
| 1. .113 | 1. .094 | 1. .095 |
| 2. .121 | 2. .095 | 2. .098 |
| 3. .126 | 3. .095 | 3. .098 |
| 4. .131 | 4. .097 | 4. .096 |
| 5. .118 | 5. .095 | 5. .099 |
| 6. .120 | 6. .098 | 6. .098 |
| 7. .114 | 7. .097 | 7. .099 |
| 8. .118 | 8. .098 | 8. .094 |
| 9. .117 | 9. .094 | 9. .095 |
| 10. .124 | 10. .094 | 10. .099 |

[1] Av./100 kernels=.120".
[2] Av./100 kernels=.096".
[3] Av./100 kernels=.097".
Percent decrease original thickness=20.0% Av.

Analytical values for final kilned [1] malt:

|  | G.A. Whole Malt | G.A. Crushed Malt |
| --- | --- | --- |
| Av. Kernel Thickness, Inch | .103 | .092 |
| Percent Decrease in Kernel Thickness |  | 10.7 |
| Malt Moisture Percent | 4.5 | 3.2 |
| Malt Color | 1.87 | 1.46 |

*Table 3*

1963 Trophy "B" barley malted in conventional manner
Green malt—approx. 45% moisture
Roll setting—.054 inch apart (av.)

| 1963 Trophy "B" whole kernels,[1] Av. thickness/ 10 kernels, inch | 1963 Trophy "B" crushed,[2] Av. thickness/ 10 kernels, inch |
| --- | --- |
| 1. .112 | 1. .083 |
| 2. .121 | 2. .082 |
| 3. .111 | 3. .079 |
| 4. .117 | 4. .085 |
| 5. .124 | 5. .082 |
| 6. .115 | 6. .080 |
| 7. .112 | 7. .083 |
| 8. .116 | 8. .085 |
| 9. .119 | 9. .078 |
| 10. .112 | 10. .082 |

[1] Av./100 kernels=.116".
[2] Av./100 kernles=.082".
Percent decrease original thickness=29.4% Av.

Analytical values for final kilned [1] malt:

|  | Trophy Whole Malt | Trophy Crushed Malt |
| --- | --- | --- |
| Av. Kernel Thickness, Inch | .103 | .086 |
| Percent Decrease in Kernel Thickness |  | 16.5 |
| Malt Moisture, Percent | 4.3 | 3.2 |
| Malt Color | 1.87 | 1.49 |

[1] Kilning was accomplished by time-temperature schedule similar to that described in previous examples for brewers' malt.

What is claimed is:

1. In the process of producing dried malt, the improvement which comprises crushing cool germinated green malt kernels at a temperature of 5° C. to 35° C. and having a moisture content of at least 25% into integral and unitary flakes characterized by breakage of the husks and a partial but minor exudation of the endosperm mass through the break in the husk, said crushing decreasing the thickness and increasing the surface to weight ratio of the kernels, to accelerate subsequent drying, and drying said flaked green malt until the moisture content of the dried malt is not more than 6%, said drying being effected at a temperature-time drying schedule which requires at least 5 hours of drying time to produce dried malt.

2. In the process of producing dried malt, the improvement which comprises crushing cool germinated green malt kernels at a temperature of 15° C. to 30° C. and having a moisture content of at least 25% into integral and unitary flakes characterized by breakage of the husks and a partial but minor exudation of the endosperm mass through the break in the husk, said crushing decreasing the thickness, and increasing the surface to weight ratio, of the kernels to accelerate subsequent drying, and drying said flaked green malt until the moisture content of the dried malt is not more than 6% with a drying temperature of not more than 60° C. being used for at least the first one-third of the total drying time, said drying being effected at a temperature-time drying schedule which requires at least 5 hours of drying time to produce dried malt.

3. In the process of producing dried malt, the improvement which comprises crushing germinated cool green malt kernels at a temperature of 15° to 30° C. and having a moisture content of at least 40% into integral and unitary flakes characterized by breakage of the husks and a partial but minor exudation of the endosperm mass through the break in the husk, said crushing decreasing the thickness, and increasing the surface to weight ratio, of the kernels to accelerate subsequent drying, and drying said flaked green malt until the moisture content of the dried malt is not more than 6% with a drying temperature of not more than 49° C. being used in the first one-fifth, and a drying temperature of not more than 60° C. being used in the first two-fifths, of the total drying time, said drying being effected at a temperature-time drying schedule which requires at least 10 hours of drying time to produce dried malt.

4. In the process of producing dried malt, the improvement which comprises crushing cool germinated green malt kernels at a temperature of 15° to 30° C. and having a moisture content of at least 25% into integral and unitary flakes of not more than about two-thirds the thickness of the uncrushed kernels and characterized by breakage of the husks and a partial but minor exudation of the endosperm mass through the break in the husk, said crushing decreasing the thickness, and increasing the surface to weight ratio, of the kernels to accelerate subsequent drying, and drying said flaked green malt until the moisture content of the dried malt is not more than 6% with a drying temperature of not more than 43° C. being used in the first one-fifth, a drying temperature of not more than 49° C. being used in the first two-fifths, and a drying temperature of not more than 60° C. in the first one-half, of the total drying time, said drying being effected at a temperature-time drying schedule which requires at least 10 hours of drying time to produce dried malt.

5. In the process of producing dried malt, the improvement which comprises crushing cool germinated green malt kernels at a temperature of 15° to 30° C. and having a moisture content of at least 40% into integral and unitary flakes of not more than about two-thirds the thickness of the uncrushed kernels and characterized by breakage of the husks and a partial but minor exudation of the endosperm mass through the break in the husk, said crushing decreasing the thickness, and increasing the surface to weight ratio, of the kernels to accelerate subsequent drying, and drying said flaked green malt until the moisture content of the dried malt is not more than 6%, with a drying temperature of not more than 43° C. being used in the first one-fifth, a drying temperature of not more than 49° C. being used in the first two-fifths, and a drying temperature of not more than 60° C. in the first one-half, of the total drying time, said drying being effected at a temperature-time drying schedule which requires at least 10 hours of drying time to produce dried malt.

6. In the process of producing dried malt, the improvement which comprises crushing germinated cool green malt kernels at a temperature of 15° to 30° C. and having a moisture content of at least 25% into integral and unitary flakes characterized by breakage of the husks and a partial but minor exudation of the endosperm mass through the break in the husk, said crushing decreasing the thickness, and increasing the surface to weight ratio, of the kernels to accelerate subsequent drying, and drying said flaked green malt until the moisture content of the dried malt is not more than 6% at temperatures which preserve the diastatic properties of the malt with a drying temperature of at least 38° C. and not more than 60° C. being used for at least the first one-third of the total drying time, said drying being effected at a temperature-time drying schedule which requires from about 5 to 15 hours of drying time to produce dried malt.

7. The process of drying green malt which comprises crushing cool germinated green malt kernels at a temperature of 5° C. to 35° C. and having a moisture content of at least 25% between cool rolls at a temperature of 5° C. to 35° C. to form the malt into unitary flakes characterized by breakage of the husks and a partial but minor exudation of the endosperm mass through the break in the husk, said crushing reducing the malt kernel thickness and increasing the kernel surface to weight ratio, and drying said flaked green malt until the moisture content of the dried malt is not more than 6%, said drying being effected at a temperature-time drying schedule which requires at least 5 hours of drying time to produce dried malt.

8. The process of claim 7 in which the green malt is germinated essentially rootlet free by the combined use of acidulation and gibberellic acid.

9. The process of claim 7 in which gibberellic acid is used in the germination of the green malt.

10. The process of drying green malt germinated essentially free of rootlets and in which gibberellic acid is used in the germination which comprises crushing the cool germinated green malt kernels at a temperature of 5° C. to 35° C. and having a moisture content of at least 25% between cool rolls at a temperature of 5° C. to 35° C. to form the malt into unitary flakes characterized by breakage of the husks and a partial but minor exudation of the endosperm mass through the break in the husk, said crushing reducing the malt kernel thickness and increasing the kernel surface to weight ratio, and drying said flaked green malt until the moisture content of the dried malt is not more than 6% at temperatures which preserve the diastatic properties of the malt with a drying temperature of at least 38° C. and not more than 60° C. being used for at least the first one-third of the total drying time, said drying being effected at a temperature-time drying schedule which requires from about 5 to 15 hours of drying time to produce dried malt.

11. In the process of producing dried malt, the improvement which comprises crushing cool germinated green malt kernels at a temperature of 5° C. to 35° C. and having a moisture content of at least 25% into integral and unitary flakes characterized by breakage of the husks and a partial but minor exudation of the endosperm mass through the break in the husk, said crushing decreasing the thickness, and increasing the surface to weight ratio, of the kernels to accelerate subsequent drying, and drying said flaked green malt until the moisture content of the dried malt is not more than 6%, said drying being effected at a temperature-time schedule which reduces by at least one-third the drying time needed to dry an uncrushed and nonflaked green malt at the same temperatures to malt of substantially the same malt properties as the flaked dry malt.

12. The process of claim 11 in which gibberellic acid is employed in the production of the green malt.

13. Cool germinated green malt in the form of integral and unitary flakes having a moisture content of at least 25% characterized by broken husks with a partial but minor exudation of the endosperm mass through the break in the husk from flaking green malt kernels at a temperature of 5° C. to 35° C.

14. A flaked malt according to claim 13 germinated with added gibberellic acid.

15. A flaked malt according to claim 13 germinated free of rootlets through an acidulation treatment in conjunction with added gibberellic acid.

References Cited in the file of this patent

UNITED STATES PATENTS

| | | |
|---|---|---|
| 1,391,557 | Mayer | Sept. 30, 1921 |
| 2,947,667 | Komm | Aug. 2, 1960 |

FOREIGN PATENTS

| | | |
|---|---|---|
| 811,374 | Great Britain | Apr. 2, 1959 |

UNITED STATES PATENT OFFICE
CERTIFICATE OF CORRECTION

Patent No. 3,168,449                              February 2, 1965

Clifford M. Hollenbeck et al.

It is hereby certified that error appears in the above numbered patent requiring correction and that the said Letters Patent should read as corrected below.

Column 3, line 11, for "an" read -- and --; line 29, for "hetaing" read -- heating --; column 4, line 13, for "braley" read -- barley --; line 28, for "intaernal" read -- internal --; line 65, for "490 C." read -- 49° C. --; column 6, line 73, for "protetin" read -- protein --; column 7, line 69, strike out "in passing through the two steel rolls, but the kernels"; column 8, after the table, about line 35, add the following footnote:

[1]Kilning was accomplished by time-temperature schedule similar to that described in previous examples for brewers' malt.

Signed and sealed this 22nd day of June 1965.

(SEAL)
Attest:

ERNEST W. SWIDER
Attesting Officer
                                         EDWARD J. BRENNER
                                         Commissioner of Patents